United States Patent [19]

Rubin

[11] 4,392,173
[45] Jul. 5, 1983

[54] CIRCUIT FOR REDUCING VOLTAGE STRESS ACROSS A TRANSFORMER

[75] Inventor: Michael D. Rubin, Saratoga, Calif.

[73] Assignee: Ford Aerospace & Communications Corporation, Detroit, Mich.

[21] Appl. No.: 330,344

[22] Filed: Dec. 14, 1981

[51] Int. Cl.³ .............................................. H02H 9/04
[52] U.S. Cl. ...................................... 361/35; 323/361
[58] Field of Search .......................... 361/35, 43, 139; 307/51, 75, 83, 326–328; 315/94, 101, 105, 107; 336/171; 323/361

[56] References Cited

U.S. PATENT DOCUMENTS

| | | |
|---|---|---|
| 1,586,162 | 5/1926 | Palmer . |
| 2,151,786 | 3/1939 | Marbury . |
| 2,599,890 | 6/1952 | Bostick . |
| 2,680,209 | 6/1954 | Veronda . |
| 3,376,491 | 4/1968 | Mas . |
| 4,087,701 | 5/1978 | Anderson ........................ 323/361 X |

OTHER PUBLICATIONS

"Electron Gun Filament Supply"–Birkhoff et al. Journal of Electron Spectroscopy and Related Phenomena 1977.

Primary Examiner—Harry E. Moose, Jr.
Attorney, Agent, or Firm—Edward J. Radlo; Robert D. Sanborn

[57] ABSTRACT

Disclosed is a circuit for protecting a transformer from high voltages in those cases where a differential and a common mode output exist at the secondary of the transformer. The differential output is a load having a relatively small voltage thereacross; the common mode output is an output terminal connected to said load and having a relatively high voltage applied thereto. The present invention replaces the transformer with two or more smaller transformers cascaded together. A resistor is connected between the primary and the secondary of each transformer. Together the resistors form a voltage dividing network which splits the single high voltage among all of the transformers, relieving the stress on each. Optional capacitors are connected in parallel across each of the resistors in the case where the interwinding capacitances of the transformers are not equal. Each of the load and the output terminal can be either an a.c. or a d.c. component. If the load is a d.c. component, a rectifier/filter is inserted between the secondary of the last transformer in the chain and the load.

6 Claims, 2 Drawing Figures

CIRCUIT FOR REDUCING VOLTAGE STRESS ACROSS A TRANSFORMER

BACKGROUND OF THE INVENTION

1. Field of the Invention

This invention pertains to the field of the protection of transformers in the presence of high voltages in a common mode/differentiated configuration. A particularly useful application for this invention is in the field of protecting the power supply transformer of a traveling wave tube amplifier (TWTA).

2. Description of the Prior Art

A prior art search uncovered the following U.S. patent references:

U.S. Pat. No. 2,680,209 shows in FIG. 7 a choke (unlabeled) which transfers the voltage from the heater transformer in a klystron to the choke itself. This device is useful only when the voltage supplied to the cathode (12') is pulsed voltage. The present invention, on the other hand, accommodates non-pulsed voltages including d.c. voltages as well as pulsed voltages. Furthermore, in the '209 patent, all the voltage drop is placed across the choke, whereas the present invention spreads the voltage between two transformers or among several transformers.

U.S. Pat. No. 2,599,890 shows a circuit for isolating heater transformer 18, 19 from the high voltage applied to the cathode in a magnetron by means of using chokes 16 and 17. As in the '209 patent, the voltage supplied to cathode 12 is a pulse, applied at terminal 13 via capacitor 20. The present invention accommodates non-pulsed as well as pulsed high voltages. Furthermore, the '890 patent develops the full voltage drop across chokes 16 and 17, whereas the present invention spreads voltage stress between two transformers or among several transformers.

Secondary references are: U.S. Pat. Nos. 1,586,162; 2,151,786; and 3,376,491.

SUMMARY OF THE INVENTION

In many applications a transformer is used to provide isolation between an a.c. source and a common mode/differential output. By this is meant that connected to the transformer secondary is a load having a relatively low voltage drop across it, and connected to said load is an output terminal elevated above ground to a relatively much higher positive or negative voltage. This situation occurs, for example, in the power supply for the heater and cathode of a TWTA. As a consequence of this configuration, the entire high voltage drop associated with the output terminal is placed across the transformer, subjecting it to grat voltage stress. It is desirable to relieve this stress across the transformer to reduce insulation requirements and/or improve reliability, hence the desirability of the present circuit.

The present invention utilizes two or more transformers in place of the single transformer of the prior art in such a way that the total voltage stress is spread (preferably evenly) between or among the transformers. This is readily accomplished by means of a resistive voltage divider network. Additionally, capacitors can be employed in parallel with each of the resistors in the voltage divider to compensate for the interwinding capacitance differences of the transformers.

Each of the load and the output terminal can be either an a.c. or a d.c. component. If the load is responsive to direct current, a rectifier and preferably a filter must be inserted between the secondary of the last transformer in the chain and the load. In this case, the divider network is connected preferably at the d.c. side of the rectifier/filter rather than the a.c. side, to prevent the low voltage current from modulating the high voltage current.

The number of transformers is normally chosen so as to bring the voltage drop across each transformer low enough so as not to overstress any one transformer.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

The invention has applicability whenever there is a transformer having a differential and a common mode output. The differential output is an a.c. or d.c. load having a low (relative to the common mode output) voltage drop across it. The common mode output is an output terminal connected to the load and is elevated to a high a.c. or d.c. voltage with respect to ground.

Figure 1:
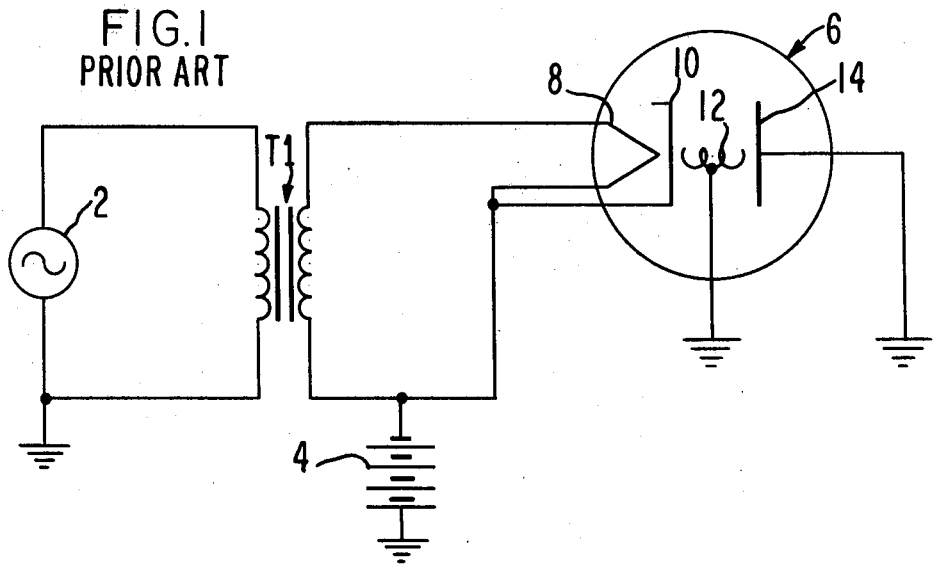
FIG. 1 is a schematic diagram of a conventional method for providing a power supply for a TWTA.

FIG. 1 illustrates the special case where the load is heater 8 of TWTA 6 and the output terminal is cathode 10 of TWTA 6. TWTA 6 also contains helix 12 and collector 14. It is often desirable in a TWTA to ground helix 12 and to operate collector 14 at or near ground potential. FIG. 1 illustrates the case where collector 14 is operated at ground potential. In this case a very high negative voltage must be applied to cathode 10 to facilitate the movement of electrons through TWTA 6. This is illustrated in FIG. 1 by means of showing d.c. power supply 4 connected between cathode 10 and ground, with the negative side of source 4 connected to cathode 10.

Because it is difficult to provide high voltage insulation within the confines of TWTA 6 itself, heater 8 is electrically connected to cathode 10. The voltage drop across heater 8 is relatively much lower than the voltage drop between cathode 10 and ground as produced by source 4.

Transformer T1 is used to provide isolation between a.c. source 2, connected to its primary, and heater 8 and cathode 10, connected to its secondary. Transformer T1 also serves to apply the proper operating voltage across heater 8, which is shown as an a.c. load, although it could also be a d.c. load.

In the circuit of FIG. 1, the entire high voltage produced by source 4 is applied across transformer T1, placing transformer T1 under great voltage stress and increasing the risk of breakdown in its insulation. Hence, the need arises to protect transformer T1 against very high voltages.

Figure 2:
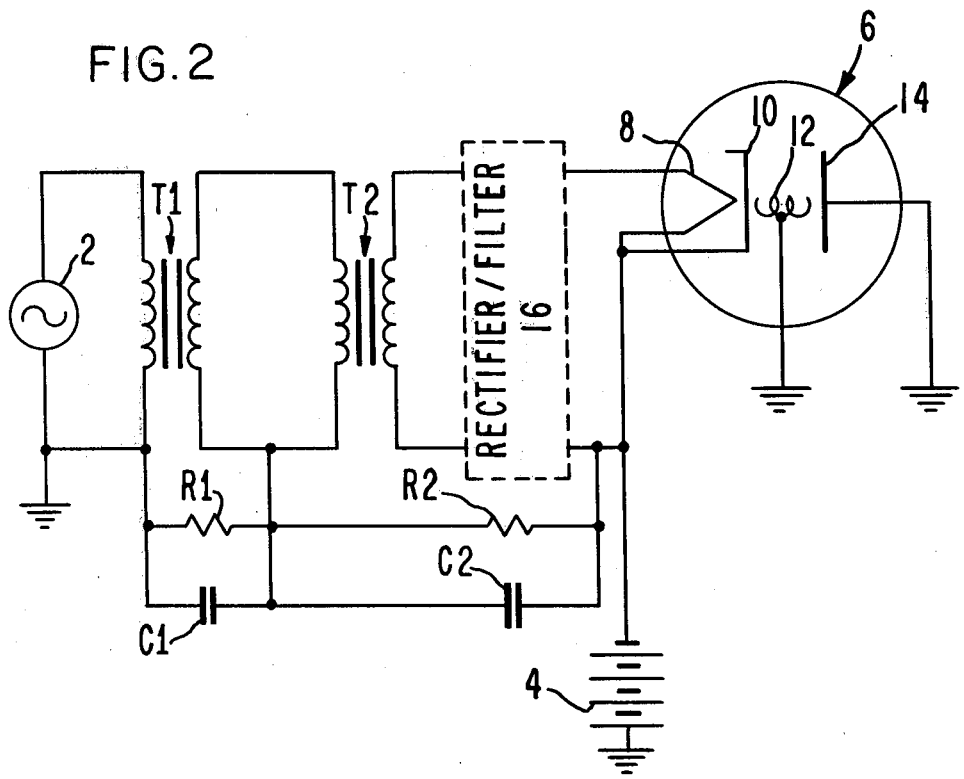
FIG. 2 is a schematic diagram of the two transformer embodiment of the present invention.

The present invention solves this problem, as is illustrated in FIG. 2. Transformer T1 is replaced by two transformers, transformers T1 and T2, each having a voltage drop across it equal to half of the voltage across T1 of FIG. 1.

Resistive network R1 and R2 forms a voltage divider which splits the voltage from source 4 between T1 and T2. R1 is connected between the primary and secondary of T1 and R2 is connected between the primary and secondary of T2. Capacitors C1 and C2, connected in parallel across resistors R1 and R2, respectively, compensate for possible differences in the interwinding capacitances of T1 and T2. If T1 and T2 have equal interwinding capacitances, then C1 and C2 can be eliminated.

In general, the equation that must be satisfied is:

$$R1(C1+CT1)=R2(C2+CT2)$$

where CT1 is the interwinding capacitance associated with transformer T1 and CT2 is the interwinding capacitance associated with transformer T2.

If load 8 is a d.c. component, then a rectifier (and preferably a filter) 16 is inserted between the secondary of T2 and load 8. This is shown by dotted lines in FIG. 2. In this case, the connection between resistive voltage divider network, R1, R2 and the secondary of transformer T2 is made on the d.c. side rather than the a.c. side of rectifier/filter 16.

If component 10 is an a.c. component rather than a d.c. component, source 4 is replaced by an a.c. source rather than a d.c. source.

Preferably T1 and T2 are selected to be as equal as possible; then the interwinding capacitances of these transformers are equal and C1 and C2 can be eliminated. R1 and R2 are preferably equal, causing the voltage drop associated with source 4 to be spread equally across T1 and T2. R1 and R2 should hve very high values (such as greater than 50 megohms) so the voltage divider will not draw too much power.

In some applications where ultra high voltages are employed, it may be necessary or at least desirable to spread the voltage among more than two transformers. In this case, any integral number n of transformers may be cascaded, with the primary of the jth transformer connected to the secondary of the (j-1)st transformer for $2 \leq j \leq n$. Each transformer has a resistor connected between its primary and its secondary. If the transformers have unequal interwinding capacitances, a capacitor is connected in parallel across each resistor. In general, the equation that must be satisfied is:

$$Rj(Cj+CTj)=Rk(Ck+CTk)$$

for all integral j, k such that $1 \leq j \leq n$ and $1 \leq k \leq n$.

Once again, if load 8 is a d.c. component, then a rectifier/filter is employed between the secondary of the nth transformer and load 8, and the nth resistor is connected preferably at the d.c. side rather than the a.c. side of the nth transformer.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A circuit for reducing voltage stress on a first transformer having a primary and a secondary, wherein a load coupled to said secondary has a first voltage thereacross, and an output terminal is connected to said load, to which a second voltage is applied that is much greater than said first voltage; said circuit comprising:
   at least one additional transformer, so that the total number of transformers is an integer n, each transformer having a primary and a secondary, wherein the primary of the jth transformer is connected to the secondary of the (j-1)st transformer for all j such that $2 \leq j \leq n$, and the secondary of the nth transformer is coupled to said load; and
   a voltage dividing network for shifting some of said second voltage from across said first transformer to across said additional transformer(s), said voltage dividing network comprising:
   n resistors, with one resistor connected between a primary and a secondary of each transformer; and
   n capacitors, each resistor having a capacitor connected thereacross;
   where $RJ(Cj+CTj)=Rk(Ck+CTk)$ for all integers j, k such that $1 \leq j \leq n$ and $1 \leq k \leq n$, where Rj is the resistance of the jth resistor, Cj is the capacitance of the jth capacitor, CTj is the interwinding capacitance of the jth transformer, Rk is the resistance of the kth resistor, Ck is the capacitance of the kth capacitor, and CTk is the interwinding capacitance of the kth transformer.

2. The circuit of claim 1 wherein said load is a heater of a traveling wave tube amplifier and said output terminal is a cathode of said traveling wave tube amplifier.

3. The circuit of claim 2 wherein the heater is operable upon the placement of an a.c. voltage thereacross and said cathode is activated upon the placement of a negative d.c. voltage thereupon.

4. The circuit of claim 1 wherein at least one of the n transformers has a core around which is wrapped its primary and its secondary, wherein no core is connected to said voltage dividing network.

5. The circuit of claim 1 wherein the input impedances across the primaries of each of the n transformers are not all the same.

6. The circuit of claim 1 wherein said load is activated upon the application of a d.c. voltage thereacross, said circuit further comprising a rectifier connected between the secondary of the nth transformer and said load for converting between a.c. and d.c.;
   wherein that end of the nth resistor which is connected to the secondary of the nth transformer is connected at the d.c. side of said rectifier.

* * * * *